United States Patent

Horcher

[11] Patent Number: 6,129,302
[45] Date of Patent: Oct. 10, 2000

[54] MEANS OF SECURING AGAINST IMPERMISSIBLE UNREELING OF A BELT ELEMENT

[75] Inventor: Stefan Horcher, Schöneck, Germany

[73] Assignee: Horcher GmbH, Nidderau, Germany

[21] Appl. No.: 09/260,072

[22] Filed: Mar. 2, 1999

[30] Foreign Application Priority Data

Mar. 2, 1998 [DE] Germany ............. 298 03 558

[51] Int. Cl.$^7$ .......... B65H 23/04; B65H 23/06; A62B 1/08; B66B 5/04
[52] U.S. Cl. ............ 242/396.1; 242/421.4; 182/236; 187/376
[58] Field of Search ............. 242/396.1, 383, 242/416, 396, 396.4, 421.4; 254/267, 375; 182/236; 187/376, 373

[56] References Cited

FOREIGN PATENT DOCUMENTS

| | | |
|---|---|---|
| 894354 | 10/1953 | Germany . |
| 7424538 | 11/1974 | Germany . |
| 3802775 | 9/1989 | Germany . |

*Primary Examiner*—John Q. Nguyen
*Attorney, Agent, or Firm*—Dennison, Scheiner, Schultz & Wakeman

[57] ABSTRACT

The invention relates to a device for securing against the impermissible unreeling speed of a belt element (80) from a shaft (82) of a lifter (70) used for transporting a handicapped person; the shaft is connected to a first gear wheel (84), in order to assure by a structurally simple arrangement that if the belt element (80) has an impermissible unreeling speed, locking of the shaft (82) occurs as a function of the speed of revolution of the shaft (82) receiving the belt element (80), a locking element (102) is moved in between the first gear wheel (84) and a gear wheel (92), as a result of which the first gear wheel (84) is blocked.

9 Claims, 3 Drawing Sheets

MEANS OF SECURING AGAINST IMPERMISSIBLE UNREELING OF A BELT ELEMENT

BACKGROUND OF THE INVENTION

The invention relates to a device for securing against impermissible unreeling of a belt element from a shaft of a lifter, in particular an overhead lifter or bottom lifter for transporting a handicapped person, in particular, wherein the shaft is connected to a first gear wheel, which can be set into rotary motion, preferably via a second gear wheel.

In particular for transporting handicapped persons from one place to another inside closed rooms, these persons can be transported by means of a lifter—either an overhead or a bottom lifter. A belt begins at the lifter and is connected for instance to a solid or cloth seat that holds the person.

The belts in such a device are unreeled from a shaft or rolled onto it by means of electric motors. To that end, a shaft meshing with a gear wheel begins at the driven shaft of an electric motor and in turn drives the shaft via a step-up gear. If the driven shaft of the meshing wheel, for instance because of wear of its teeth, no longer assures the desired positive or nonpositive engagement, the risk is that once the person has been lifted he will be lowered with an impermissible speed, thus increasing the risk of injury.

German Patent Disclosure DE 195 44 056 A1 describes a person hoist, in which failure of the transport belt causes a catch belt to become operative, so that locking occurs if the lowering speed is impermissible.

OBJECT OF THE INVENTION

The object of the present invention is to refine a securing device of the device mentioned at the outset in such a way that with structurally simple means it is assured that locking of the shaft will occur if there is an impermissible unreeling speed of the belt, to avert any danger to a person to be transported.

According to the invention, this object is attained essentially in that as a function of the speed of revolution of the shaft receiving the belt element, a locking element can be moved between the first gear wheel and a further or second gear wheel and/or a detent disk connected to the shaft can be blocked by a latch lever interacting with it.

Preferably, the latching element is wedge-shaped, at least on its end, and when acted upon by force it can be pushed with its tip in between the meshing gear wheels. To that end, the latching element can be connected to or at least movable by an armature of a magnet. The magnet itself is activated, as a function of the speed of revolution of the shaft or its rpm, in order to displace the latching element. The rpm of the shaft itself can be measured via a pulse counter, so as then to activate the magnet.

To bring about effective blocking of the meshing gear wheels, one of which is connected directly to the shaft, it is provided in a refinement of the invention that the latching element, embodied as preferably wedge-shaped toward its tip, is structured at least on a side interacting with one of the gear wheels. Preferably, a geometry is selected that corresponds to that of the meshing gear wheel.

By the teaching of the invention, the latching element is moved between the meshing gear wheels at the moment when the shaft receiving the belt element has an impermissibly high rotary speed that would otherwise cause a seat to be let down, possibly endangering a person.

The latching element interacting with the meshing gear wheels is then drawn between the gear wheels, thus bringing about the automatic blocking of the gear wheels and thus stopping the shaft.

In an alternative embodiment for blocking the shaft at an impermissible speed of revolution, it is provided that the detent disk has peripherally hooklike protrusions, which interact with the latch lever for its motion oriented toward and away from the detent disk, and because of the inertia of the latch lever, it blocks the detent disk, if there is an impermissible speed of revolution, by causing the latch lever to come to rest on one of the hooklike protrusions. In particular, the latch lever comprises one portion that is circular in plan view and is centrally penetrated by a pivot axis, with a portion, which can be placed by the portion against one of the protrusions of the detent disk. This portion is rectangular in plan view, having an outer leg remote from the detent disk which forms a tangent to the circular portion. In particular, the detent disk has six protrusions distributed uniformly over its circumference. A number other than six is equally possible.

The protrusions of the detent disk are formed by first, second and third portions; the first portion, which can be placed against the latch lever, extends along a straight line that intersects the axis of the detent disk. The first portion changes over into a second portion, extending in inclined fashion relative to the interior of the detent disk, which portion in turn extends as a third portion toward a beginning, toward the pivot axis, of a succeeding first portion. The third portion is approximately 3 to 5 times longer than the second portion.

Further details, advantages and characteristics of the invention will become apparent not only from the claims and the characteristics to be learned from them, alone and/or in combination, but also from the ensuing description of the preferred exemplary embodiments.

DETAILED DESCRIPTION OF THE INVENTION

Known overhead or bottom lifters for transporting persons have a belt that can be wound onto or unwound from a shaft and at this belt, in turn, a seat or a seatbelt for a person begins. Alternatively, a mount or a housing from which the seat or seatbelt begins can be raised or lowered via the belt. By these provisions, it is possible to transport the person from one place to another, with the seat being in the raised position during transport. The shaft itself is set into rotary motion by means of an electric motor, preferably a battery-powered electric motor, and step-up gears are present between the driven shaft of the motor and the shaft itself. The shaft is connected to a gear wheel which meshes directly with a second gear wheel that in turn interacts for instance with the driven shaft of the electric motor.

To assure that an impermissibly high speed of revolution of the shaft, which would cause impermissibly rapid unreeling of the belt, is prevented, it is provided according to the invention that the shaft can be blocked as a function of its speed of revolution.

Figure 1:
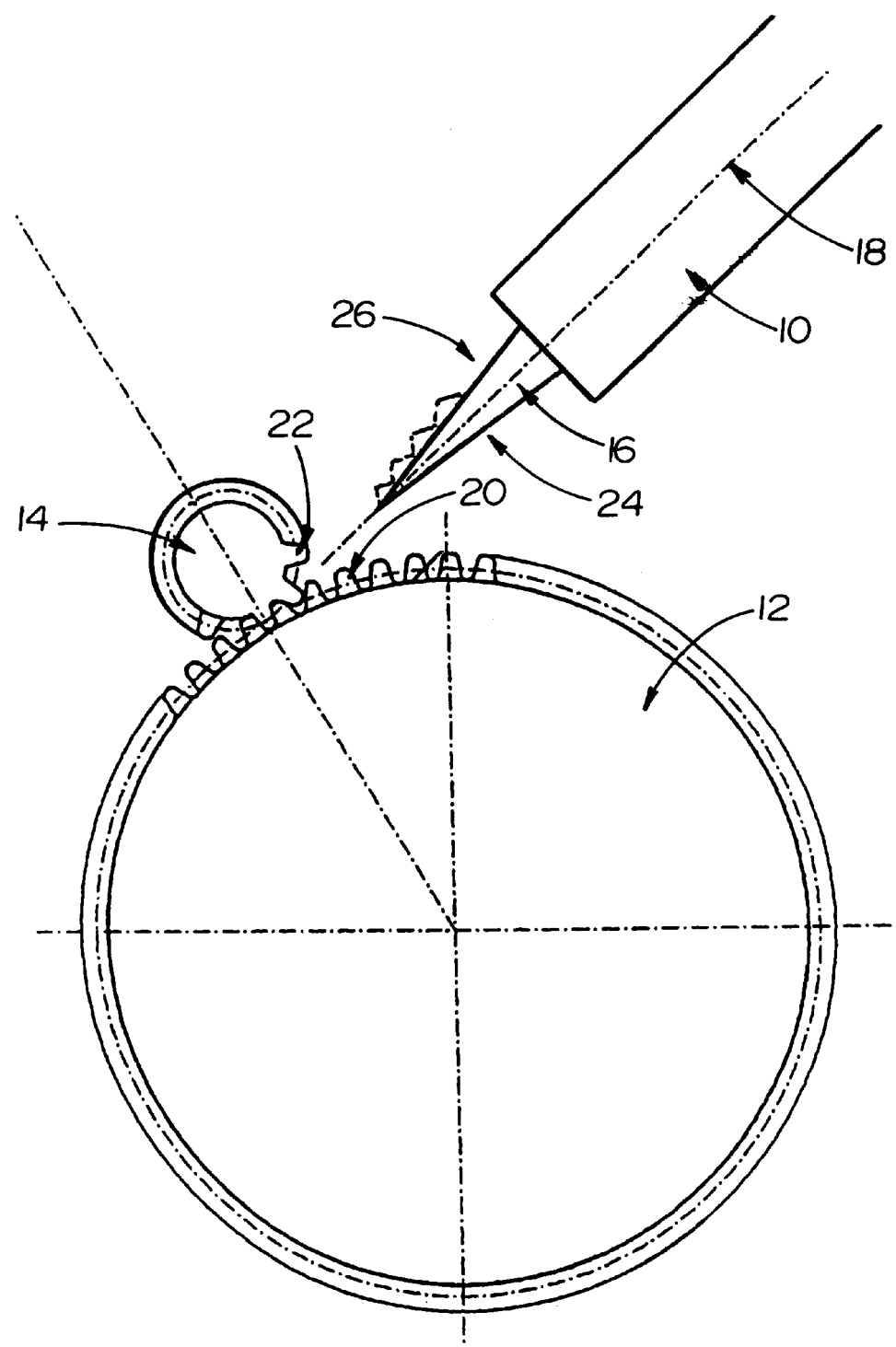
FIG. 1 is a plan view of a meshing gear wheels associated with a shaft of a lifter.

To that end, in the exemplary embodiment of FIG. 1, a latching element 10 is provided, actuatable for instance via an electromagnet, not shown; it can be pushed between two meshing gear wheels 12, 14 whenever the gear wheel connected directly to the shaft, in the exemplary embodiment the gear wheel 12, has an impermissibly high speed of revolution, which can be determined for instance by means of a pulse counter. The gear wheel 14 itself can be connected either directly or indirectly to the driven shaft of an electric motor. It is understood that the gear wheel 12 connected to the shaft can also be driven via a further gear wheel.

The latching element 10 has a front end 16 that tapers to a point that can be pushed into the operative region between the gear wheels 12, 14 along the straight line 18, if the magnet is activated in response to an impermissibly high speed of revolution and if the latching element 10 is thus displaced in the direction of the gear wheels 12, 14. By means of the wedgelike front end 16, the latching element is engaging teeth 20, 22 of the gear wheels 12, 14. It is pulled in between these teeth, thus making the gear wheels 12, 14 nonrotatable, and as a consequence the shaft beginning at the gear wheel 12 comes to a stop.

If in the exemplary embodiment of FIG. 1 the sides 24, 26, oriented toward the teeth 20, 22, of the wedgelike or ramp-shaped tip region 16 of the latching element 18 are embodied as smooth, then the possibility exists of tooth-like structuring one or both faces 24, 26 (the structuring is suggested by dash-lines), thus facilitating an engagement by one of the gear wheels 12, 14 and thus pulling the latching element 18 in between the gear wheels.

It can also be seen from the view in FIG. 1 that the longitudinal axis 18 of the latching element 18, which coincides with the direction of motion, intersects the connecting line between the axis of rotation of the gear wheel 12 and the axis of rotation of the gear wheel 14 at a right angle or substantially at a right angle.

Figure 2:
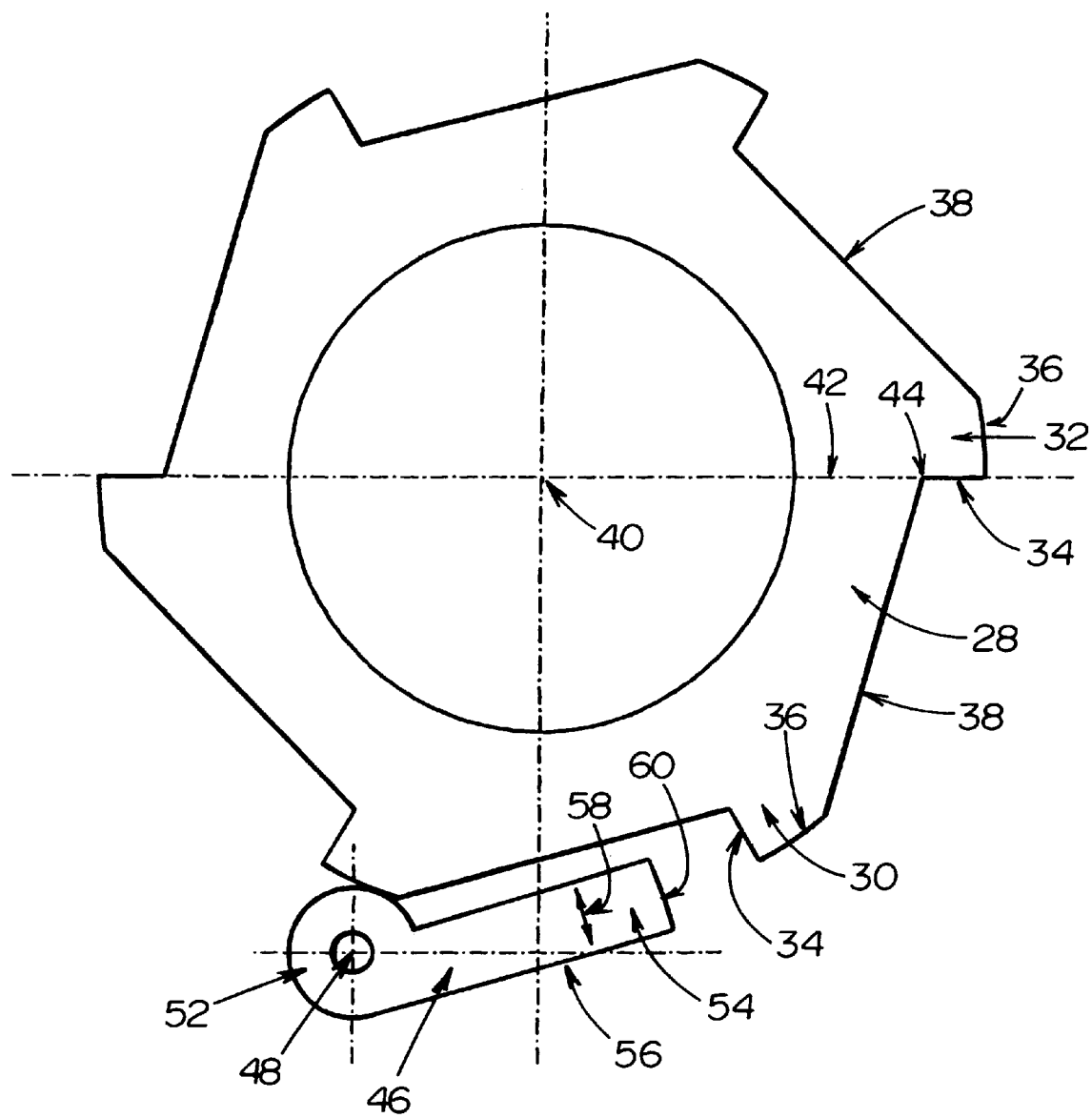
FIG. 2 is a basic illustration of a detent disk with a latch lever, likewise associated with a shaft of a lifter.

FIG. 2 shows an alternative embodiment for blocking a shaft, connected to a detent disk 28, of a lifter such as an overhead or bottom lifter, in order once again to enable blocking the shaft and thus the detent disk 28 as a function of the speed of revolution. In FIG. 2, this is attained by purely mechanical means.

The detent disk 28, connected to the shaft, not shown, of the lifter that receives a belt has protrusions 30, 32, distributed uniformly over its circumference, which are composed of first, second and third portions 34, 36, 38. The first portion 34 extends along a radius 42 that begins at the axis of rotation 40 of the shaft and thus of the detent disk 28. The second portion 36 extends inclined toward the shaft axis 40, and then changes over into the more markedly inclined third portion 38, which connects the second portion 36 to the end 44 toward the axis of the succeeding first protrusion 32.

In other words, the detent disk 28 peripherally has a hook geometry that is formed by the protrusions 30, 32.

A latch lever 46 is associated with the detent disk 28; it comprises a portion 52 of circular cross section penetrated centrally by a pivot axis 48 and an end portion 54 of rectangular cross section beginning at the circular portion 52. The leg 56 of the end portion 54 remote from the detent disk changes over in the direction of a tangent to the circular portion 52. The width of the end portion 54 is approximately equivalent to the height of a first portion 34 of the toothlike or hooklike protrusions 30, 32 of the detent disk.

If the shaft directly connected to the detent disk 28 is now rotated in order to let out a belt beginning at the shaft, then the latch lever 46 is set into a reciprocating motion (suggested by double arrow 58) by the interaction of the circular portion 52 with the ramplike second portion 36 of the protrusions 30, 32 of the detent disk 28 as a result of gravity; however, if the speed of revolution is impermissible, the projecting portion 56, moves out of the range of motion of the protrusions 30, 32. If the speed of revolution becomes too high, the portion 54 is no longer able to pivot by gravity out of the way of the protrusions 30, 32, so that the portion 54, with its end face 60, comes to rest on a first portion 34 of one of the protrusions 30, 32; as a result the detent disk 28 and thus the shaft comes to a stop. Any further unwinding of the belt from the shaft is then no longer possible.

It can be appreciated that the detent disk 28 in the exemplary embodiment must be rotated clockwise so that the latch lever 46 can block the detent disk 28.

Figure 3:
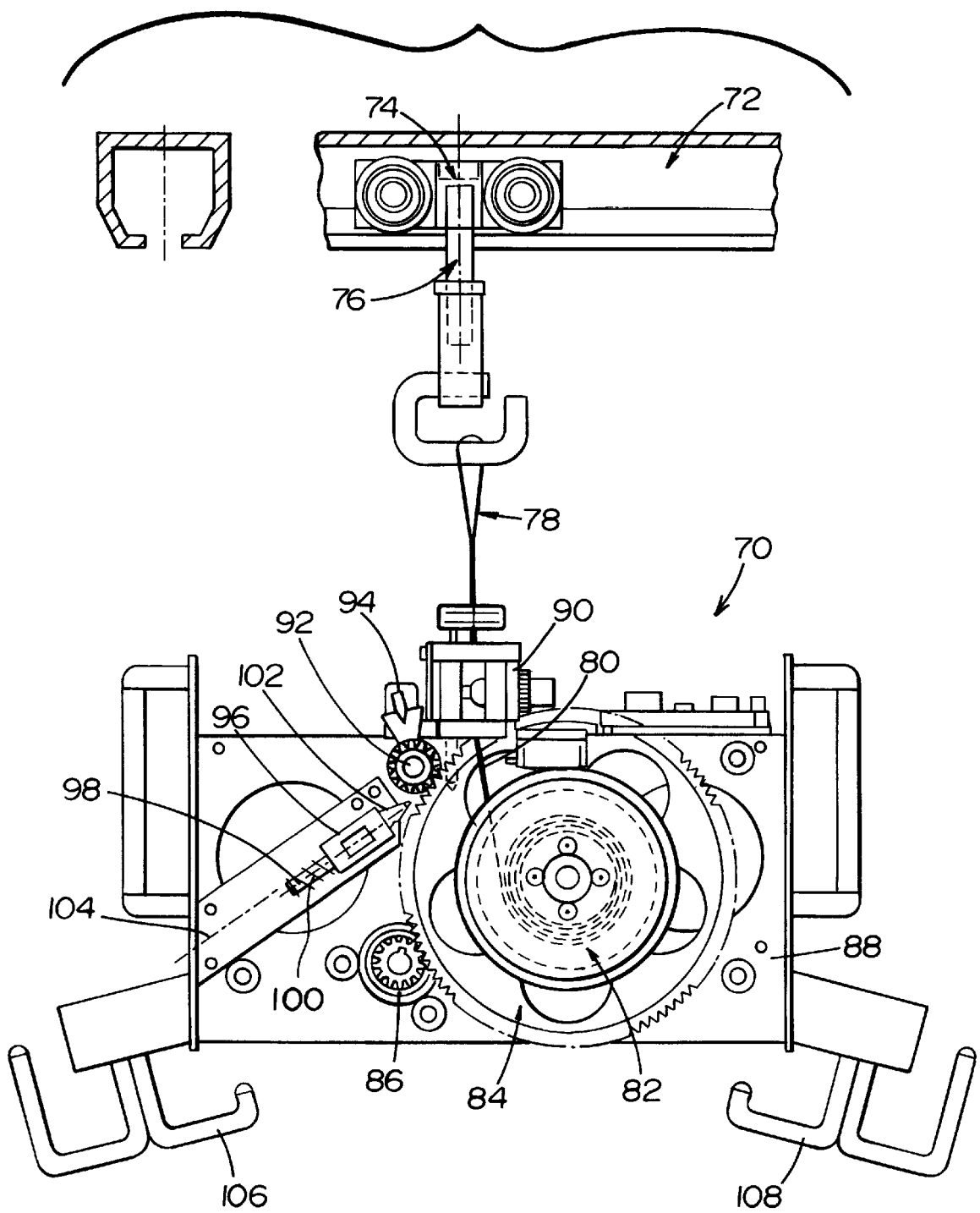
FIG. 3 is a detail of an overhead patient lifter.

In FIG. 3, an overhead person lifter 70 is shown in detail; by means of this lifter, a handicapped person can be driven from one place to another and then let down. To that end, a beam 72 extends along a ceiling, not identified by reference numeral; a preferably battery-operated rotor 74 can be moved along the beam. The rotor 74 has a hook 76, from which a loop 78 of a belt 80 can be hung, the belt being capable in turn of being wound up or unwound from a shaft 82 or reel. To that end, the shaft 82 is connected to a gear wheel 84, which is set into rotary motion via a drive pinion 86 so that the belt 80 can be wound up onto the shaft 82 or let out from it. The pinion 86 is set into rotary motion by an electric motor, preferably a battery-operated motor. The elements designated above are disposed in a housing 88, from which mounts or fastenings 106, 108 extend, and from which belts or seats can be hung in the usual way in order to receive persons.

The belt 80 penetrates the housing 88 via an opening, with which a slackline securing means 90 as taught by German Utility Model DE 91 10 218 U1 is associated. As a result, it is monitored whether the belt 80 is sufficiently taut. If not, the drive and thus rotation of the pinion 86 are discontinued by means of the slackline securing means 90.

Also meshing with the gear wheel 84 is a pinion 82, which corresponds to the gear wheel 14 of FIG. 1. Via a pulse counter 94, which can be embodied as a light gate, the rotary speed of the pinion 92 is monitored. If in the exemplary embodiment of FIG. 1 an overly high pulse count and thus speed of revolution of the pinion 92 is ascertained, a signal for an electromagnet 96 is tripped, so that the tappet 98 of the electromagnet, with its front end 102 embodied as a latching element or a corresponding element connected to the tappet, enters the region between the meshing gear wheels 84, 92, as a result of which the latching element 102 is drawn in between the gear wheels 84, 92, thus preventing any further rotation of the gear wheels.

The electromagnet 96 is secured to a mounting plate 104. It can also be seen that the tappet 98 is surrounded by a helical spring 100, which is braced on the housing of the magnet 96. Thus the latching element 102 originating at the tappet 98, or in other words the tip of the latching element, can be moved into the region between the gear wheels 84, 92 only when the magnet 96 is sufficiently excited.

A controlling printed circuit board is also disposed on the housing 88 itself; by way of it, among other actions, evaluation of the signals of the pulse counter 94 and thus triggering of the magnet 96 are effected and the drive for the shaft 82 is controlled.

What is claimed is:

1. A device for securing against impermissible unreeling speed of a belt element (80) from a shaft (82) of a lifter, in particular an overhead lifter or bottom lifter for transporting a handicapped person, wherein the shaft is connected to a first gear wheel (84), which is set into rotary motion via a second gear wheel which meshes directly with said first gear wheel (86), as a function of the speed of revolution of the shaft (82) receiving the belt element (80), a latching element (10, 102) is moved between the first gear wheel (12, 84) and the second gear wheel (14, 92).

2. The securing device of claim 1, wherein the latching element (10, 102) is wedge-shaped, at least on an end, and when acted upon by force the latching element can be pushed with the tip in between the meshing gear wheels (12, 14, 84, 92).

3. The securing device of claim 2, wherein the latching element (10), embodied as wedge-shaped toward the tip, is structured tooth-like at least on one side interacting with one of the gear wheels (12, 14).

4. The securing device of claim 3, wherein the tooth-like structured side of the latching element (10) has a geometry which corresponds to that of the gear wheel (12, 14) interacting with the structured side (24, 26) of the latching element (14).

5. The securing device of claim 1, wherein p1 latching element (10, 102) is connected to and movable by an armature (98) of a magnet (96).

6. The securing device of claim 5, wherein the magnet is activated, as a function of the speed of revolution of the shaft (82), in order to displace the latching element (10, 102).

7. The securing device of claim 6, wherein the rotary speed of the shaft (82) is measured by a pulse counter (94).

8. The securing device of claim 1, wherein the latching element (10, 102) is pulled in between the meshing gear wheels (12, 14, 84, 92) in order to block them.

9. The securing device of claim 1, wherein the latching element (10) is displaceable along a straight line (18) between the gear wheels (12, 14, 84, 92), which line vertically intersects a straight line connecting the axes of rotation of the shafts of the gear wheels.

* * * * *